Feb. 11, 1930.       E. E. DAVIS       1,746,381
BORING TOOL
Filed Feb. 4, 1925
Fig. 1.
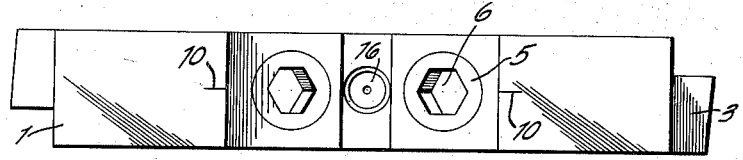
Fig. 2.   Fig. 6.
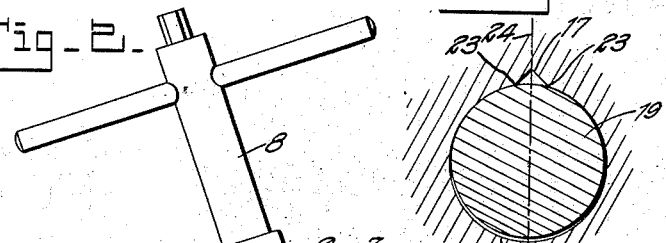
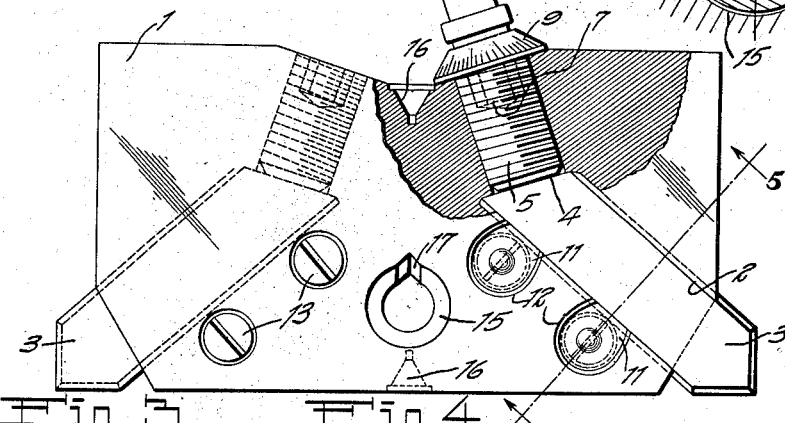
Fig. 3.   Fig. 4.   Fig. 5.
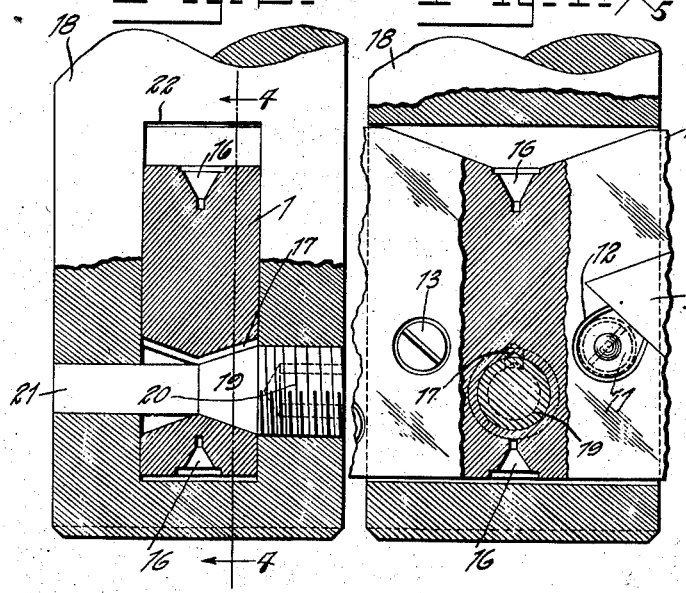
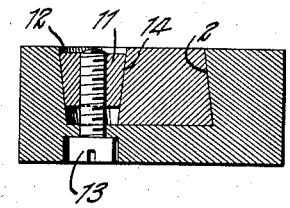
Inventor:
Emery E. Davis.
by John N Bruninga
His Attorney.

Patented Feb. 11, 1930

1,746,381

UNITED STATES PATENT OFFICE

EMERY E. DAVIS, OF ST. LOUIS, MISSOURI, ASSIGNOR, BY MESNE ASSIGNMENTS, TO DAVIS BORING TOOL COMPANY, OF ST. LOUIS, MISSOURI, A CORPORATION OF MISSOURI

BORING TOOL

Application filed February 4, 1925. Serial No. 6,682.

This invention pertains to boring tools and more particularly to that type in which the cutter or cutters are adjustably mounted in a cutter block which in turn is mounted in the boring bar.

In such a tool especially where intended for very accurate work it is very important that the cutters be accurately alined or centered in the boring bar. According to present constructions the cutter block is usually provided with a tapered hole or socket into which a tapered centering plug may be set for centering the block in the boring bar. In order that the cutters may have a solid backing in the boring bar it is usual to set the centering plug slightly eccentrically with respect to the socket in the block. The eccentricity is towards the rear of the boring bar so that the plug when set in the socket will force the block firmly against the rear of the cutter block opening in the boring bar. With such a construction, even when the eccentricity is very slight, the centering plug has a bearing against the block practically along a single line only. This line is furthermore not accurately determined since it forms the contact of one cone within another of substantially the same size. In fact the bearing line may change with successive settings of the block. Accordingly precise centering of the cutter block is impossible with such a construction.

One of the objects of this invention, therefore, is to provide a construction in which the centering plug will accurately center the cutter block in the boring bar.

Another object is to provide improved means for adjusting the cutter in the block.

Anohter object is to provide improved means for clamping the cutters in adjusted position.

Further objects will appear from the following description taken in connection with the accompanying drawing in which:

Figure 1 is a top view of a cutter block embodying this invention;

Figure 2 is a front view of same shown with the adjusting wrench in place;

Figure 3 is a central longitudinal section of part of the boring bar taken transversely of the cutter;

Fig. 4 is a section on line 4—4 of Figure 3;

Figure 5 is a detail section on line 5—5 of Figure 2; and

Figure 6 is an enlarged detail of Figure 4 showing the engagement of the centering plug with its socket.

Referring now to the drawing 1 designates the body of the cutter block. This may be provided with 1 or more grooves or channels 2 in which the cutters 3 are mounted for sliding adjustment. The grooves 2 may be cut at an angle with the axis of the block and the cutters may be adjusted therein by sliding them forwardly and outwardly for increasing the diameter of the bore cut. The rear end of the cutter 3 may be tapered so as to provide an angularly disposed abutment 4.

Mounted in the block 1 but at an inclination with the cutter 3 is an adjusting screw 5 provided with a flat end forming an abutment adapted to engage the abutment 4 of the cutter. By screwing up the screw 5 the cutter 3 will be fed forwardly along its slot so as to increase the diameter of the bore cut. The head of the screw 5 may be provided with an angular socket 6 adapted to reecive the correspondingly formed head 7 of a wrench 8 for adjusting the same. The wrench 8 may be provided with a flange 9 provided with a suitable scale which, in co-operation with an index 10, is adapted to indicate the exact amount of adjustment of the cutter 3. By means of this construction any desired adjustment of the cutter may be accurately made by referring to the scale 9.

The cutter 3 may be clamped in adjusted position by one or more clamping elements 11 each fitting in a tapered socket 12 in the block 1 and adapted to be drawn up by a screw 13 which is threaded into the element 11 as shown in Figure 5. The clamping element 11 has the form of a truncated oval, its truncating face 14 providing an abutment for engaging the side face of the cutter 3 for clamping the same in place. The socket 12 is formed to fit the element 11 so that there will be no tendency of the clamping element to turn round in its socket when the cutter 3 has been withdrawn from the block. This construction provides that the cutter may at any time be withdrawn, for repairs or replacement by a new cutter, and when the cutter is inserted the clamping elements will always be in the proper position to engage the same.

In order to provide for accurately centering the cutters in the boring bar a centering socket 15 is provided in the block 1. This socket is preferably placed in the axis of the block as determined by the grinding centers 16, but may of course, be placed in any other suitable position. In a direction from the center of the socket 15 parallel to the axis of the block a V-notch 17 is cut in the socket and preferably parallel to the side thereof. The notch 17 has its sides accurately located at equal distances from the axis through the center of the socket. The boring bar 18 may have mounted therein a centering plug having a tapered portion 19, a screw head 20 and a pilot 21. The head 20 engages threads in the boring bar while the pilot 21 engages a suitable pilot hole therein. The axis of the centering plug is slightly nearer to the rear face 22 of the block opening in the boring bar than is the center of the socket 15 in the block. This provides that when the plug is screwed down it will force the block rearwardly against the face 22. In so doing the plug 19 engages the socket 15, not along a single line as in the ordinary construction, but along two bearing parts formed at the edges 23 of the notch or groove 17 as illustrated in Figure 6. In this figure the eccentricity is of course greatly exaggerated but the figure shows that the plug bears against the socket at the two bearing points 23 which are equally spaced on opposite sides of the centering axis 24 passing through the center of the socket 15. This provision of two bearing parts on opposite sides of the centering axis insures that the plug will always bear at these two points and eliminates entirely the possibility of bearing at a single point or line which may shift its position from time to time.

It will thus be seen that in accordance with this invention the cutter block may be accurately centered in the boring bar so that when the cutters have been adjusted and accurately ground on the centers 16, it may be mounted in the boring bar accurately in the center so that both cutters will do equal amounts of work in the boring operation.

The novel construction of the cutters 3 and the adjusting screws 5 provides a solid bearing between flat surfaces at the abutment 4 so as to avoid excessive wear at this point, while at the same time, the screw 5 is set in the block at such an angle as to make it convenient to use the wrench 8 for adjusting the same so that the adjustment may be observed on the indicating scale 9.

The improved construction of the clamping elements 11 also avoids inconvenience in removing and replacing cutters since the clamping elements will retain their position facing the cutter.

It is obvious that various changes may be made in the details of construction without departing from the spirit of this invention; it is to be understood, therefore, that this invention is not to be limited to the specific details shown and described.

Having thus described the invention what is claimed is:

1. In a boring tool, a block provided with a centering socket having a centering groove providing clearly defined bearing parts on opposite sides of and positioned laterally of a centering axis, and a centering plug in said axis engaging said socket and forced against and between said parts so as to bear equally on said parts.

2. In a boring tool of the type in which a cutter block is mounted in a boring bar, means for centering the block, comprising, means on the block providing a centering socket adapted to receive a centering plug, the walls of said socket having a gap providing at its edges clearly defined spaced bearing parts, a plug adapted to enter said socket to engage said bearing parts, and means for forcing said plug against and between said parts in order to center the block.

3. In a boring tool, a cutter block, a pair of cutters mounted for adjustment therein in inclined directions relatively thereto and laterally spaced from one another, each of said cutters having an abutment at the end thereof inclined to said cutter so as to approach parallelism with the rear face of said block, an adjusting screw for each of said cutters movable in a direction nearly perpendicular to the rear face of said block and engaging said abutment perpendicularly to adjust said cutter, said block having a truing center between said screws, and means for manipulating said screws having a graduated dial element movable therewith in a plane approaching parallelism with said rear face of said block and co-operating with an index thereon to indicate the extent of adjustment.

4. In a boring tool, a cutter block, a pair of cutters mounted for adjustment therein in inclined directions relatively thereto and laterally spaced from one another, each of said cutters having an abutment at the end thereof inclined to said cutter so as to approach parallelism with the rear face of said block, an adjusting screw for each of said cutters movable in a direction nearly perpendicular to the rear face of said block and engaging said abutment perpendicularly to adjust said cutter, and means for manipulating said screws having a graduated dial element movable therewith in a plane approaching parallelism with said rear face of said block and cooperating with an index thereon to indicate the extent of adjustment, said block having a centering element on said rear face between said screws.

In testimony whereof I affix my signature this 19th day of Dec., 1924.

EMERY E. DAVIS.